E. C. PHILLIPS.
DEMOUNTABLE RIM.
APPLICATION FILED JUNE 24, 1910.
1,001,886.
Patented Aug. 29, 1911.
2 SHEETS—SHEET 2.
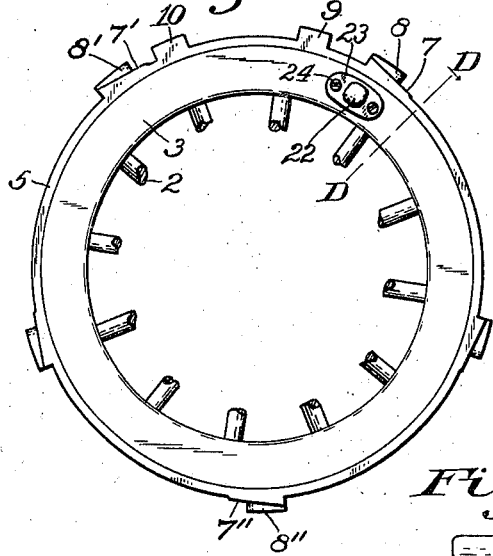
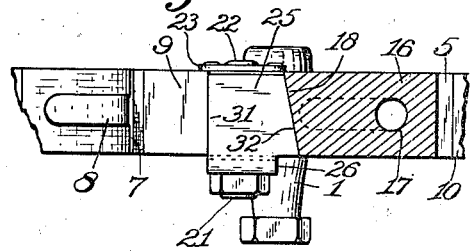
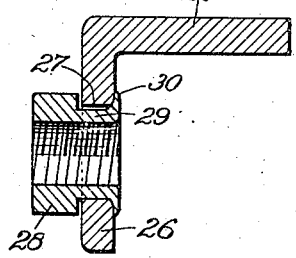
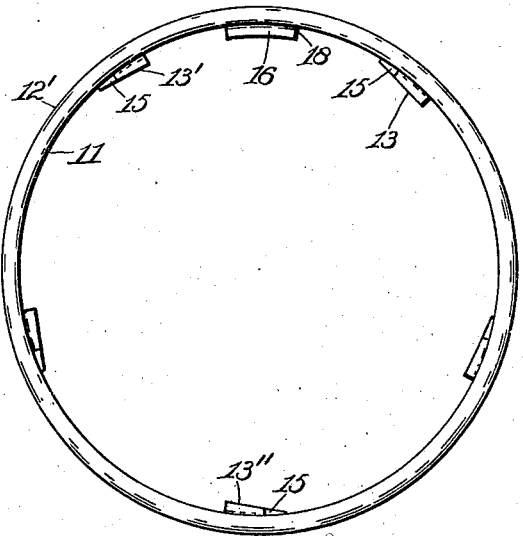
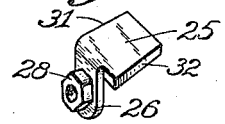
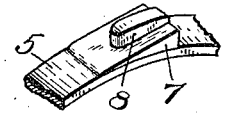
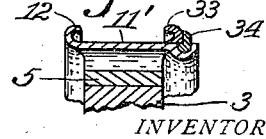
WITNESSES:
J. H. Gardner
H. R. Woddell
INVENTOR:
Elwood C. Phillips,
BY
E. T. Silvius,
ATTORNEY.

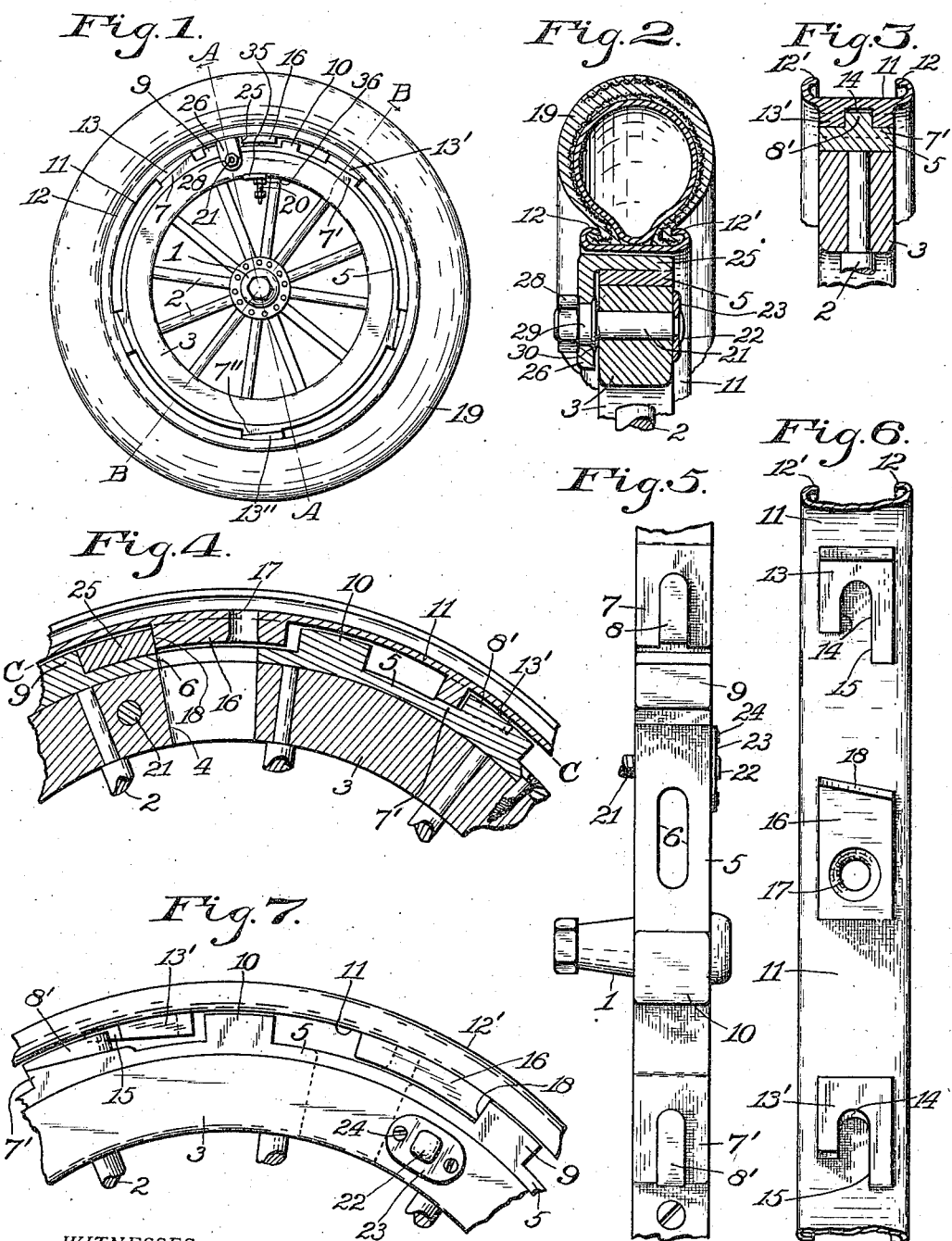

UNITED STATES PATENT OFFICE.

ELWOOD C. PHILLIPS, OF CHICAGO, ILLINOIS, ASSIGNOR TO PHILLIPS DEMOUNTABLE RIM COMPANY, OF INDIANAPOLIS, INDIANA, A CORPORATION OF INDIANA.

DEMOUNTABLE RIM.

1,001,886.  Specification of Letters Patent.  Patented Aug. 29, 1911.

Application filed June 24, 1910. Serial No. 568,630.

*To all whom it may concern:*

Be it known that I, ELWOOD C. PHILLIPS, a citizen of the United States, residing at Chicago, in the county of Cook and State of Illinois, have invented certain new and useful Improvements in Demountable Rims; and I do declare the following to be a full, clear, and exact description of the invention, reference being had to the accompanying drawings, and to the letters and figures of reference marked thereon, which form a part of this specification.

This invention relates to the class of vehicle wheels and the type that have pneumatic tires or perishable tires that may require repairing and which can best be repaired when removed from the wheel, the invention having reference more particularly to an improved wheel having a rim that is adapted to be quickly demounted with a tire thereon, so that quick changes may be made and the damaged tire removed without proceeding to a repair shop, and another rim with a tire thereon in good condition placed upon the wheel with a trifling loss of time.

The object of the invention is to provide an improved vehicle wheel that will be adapted to permit quick changes of tires in order that loss of time may be avoided when the vehicle is in use; another object being to provide a demountable rim that will not be liable to stick fast after having been on a wheel a considerable time or operated on wet and muddy roads; a still further object being to provide a wheel having a demountable rim that may be constructed at relatively small cost and be reliable and durable in use.

The invention consists in a wheel having an improved demountable rim thereon to which a tire may be attached, and novel means for tightly securing the rim on a wheel; and the invention consists further in the parts, and combinations and arrangements of parts, as hereinafter particularly described and claimed.

Referring to the drawings Figure 1 is an elevation of the improved wheel and rim with a pneumatic tire thereon; Fig. 2, a fragmentary section on the line A A in Fig. 1; Fig. 3, a fragmentary section on the line B B in Fig. 1; Fig. 4, a fragmentary central section at right angles to the axis of the wheel; Fig. 5, a fragmentary view showing a portion of the face of the wheel felly band; Fig. 6, a fragmentary view of the inner side of the demountable rim; Fig. 7, a fragmentary elevation of the side of the wheel opposite that shown in Fig. 1; Fig. 8, an elevation of the felly minus the rim; Fig. 9, a fragmentary section on the curved line C C in Fig. 4; Fig. 10, a side view of a swivel nut comprising a part of the locking apparatus for the rim; Fig. 11, a sectional view of the swivel nut and locking wedge with which it is connected; Fig. 12, a side view of the improved rim; Fig. 13, a perspective view of the locking wedge and its operating nut; Fig. 14, a fragmentary perspective view of the rim; and Fig. 15, a fragmentary section as on the line D D with a modified form of rim.

Similar reference characters in the different figures of the drawings indicate corresponding elements or features of construction herein referred to.

In the drawings the numeral 1 indicates a wheel hub which may be variously constructed, 2 the wheel spokes and 3 the felly or principal part thereof to which the spokes are attached, the felly having a slot 4 therein between two of the spokes. The felly is usually constructed of wood and when composed of such material it is provided with a metallic band 5 which is suitably secured thereon and has a slot 6 therein registering with the slot 4 through which the inflating nipple of the pneumatic tire may extend. The band 5 of the felly has a plurality of wedges 7, 7', 7'', on its periphery, the outer faces of the wedges being tangential to the periphery of the band. The band has also a plurality of projections that serve to key the rim to the band, and it is preferred that the projections 8, 8', 8'', be on the wedges as illustrated and of less length than the face of the wedge circumferentially. The band has also two abutments 9 and 10 thereon between two of the wedges.

A rim 11 is variously constructed in detail so as to be adapted to have different types of tires attached thereto and may suitably have two of the common form of flanges 12 and 12' thereon for holding a tire on the rim. The inner side of the rim has a plurality of wedges 13, 13', 13'', thereon that are inclined oppositely to the wedges on the band, and each wedge has a recess 14 therein that extends from the thinner end of the wedge inward toward the thicker end thereof. One side of the wedge extends somewhat farther circumferentially than the opposite side so as to constitute a guide 15 for use in placing the rim on the wheel. The inner side of the rim has also an abutment 16 thereon in which is a hole 17 that extends through the rim to receive the inflating nipple of the tire, one end of the abutment having an oblique angled face 18 which is presented toward the abutment 9 when the rim is on the wheel. A pneumatic tire 19 is suitably attached to the rim, being the type commonly used, especially in automobile construction, 20 indicating the inflating nipple.

In order to securely lock the rim so as to hold the projections 8 in the recesses 14, a bolt 21 is provided that has a head 22 on one end thereof to which a securing plate 23 is attached, the bolt extending through the felly 3, and the plate being secured to one side thereof by means of screws 24 or otherwise as may be preferred. A wedge 25 is provided which has an integral keeper 26 thereon that has an aperture 27 therein, the wedge being operated or secured in proper position by means of a nut 28 that is fitted on the bolt 21 and has a cylindrical barrel 29 extending through the aperture 27 and rotative, the end of the barrel having a flange 30 thereon at the inner side of the keeper, so that the nut is swiveled in the keeper. The wedge has one square side 31 that normally engages the abutment 9 and an oblique angled side 32 that engages the abutment 16 when the rim is locked on the wheel.

It will be understood that the rim may have well known contour as 11', Fig. 15, and have an integral flange 12 and a removable flange 33 held in place by a key-ring 34 for holding a tire removably on the rim. It will be understood also that a plate 35 may be held against the felly 3 by means of a nut 36 on the inflating nipple in order to cover the inner end of the slot 4 in the felly.

The wedges 7 may be variously provided either integral with the band or separately as in Fig. 14 and suitably attached to the band, it being understood that the wedges might be struck up from the metal of the band in dies or may be either welded or riveted thereto if made separately. The same explanation applies also to the wedges 13 as well as to the different abutments referred to. Also various modifications as to details may be fairly made within the scope of the accompanying claims.

In practical use it is seen that the surfaces that are in contact as between the detachable rim and the felly band are relatively small, so that in case the contact surfaces become rusted it will not be impossible to break the joint when it becomes necessary or desirable to demount the rim, and it will be seen also that the faces of the wedges may be readily made to fit neatly together, so as to practically exclude an injurious amount of moisture; nor can mud or sand get in between the bearing faces as is the case when the contact between the rim and the felly band is substantially continuous without being machined accurately.

When applying the rim on the wheel it is placed over the band somewhat as in Fig. 7 until the guide ends 15 come in contact with the projections 8 or 8' and then the rim is moved slightly by hand circumferentially until it begins to tighten by reason of the wedges being in contact, and then a suitable instrument is inserted between the abutments 9 and 16 and the rim moved farther until the wedges 25 can be inserted between the two abutments, after which the nut 28 is screwed onto the bolt 21 and the wedge forced into the desired position to securely lock the rim on the band of the felly with the projections 8 in the recesses 14, which prevent a possibility of the rim coming off laterally. In order to quickly demount the rim it is only necessary to unscrew the nut 28 from the bolt 21 which withdraws the wedge, and then a suitable hand instrument may be inserted between the abutments 10 and 16 to force the wedges apart and thus release the rim which then may be drawn laterally from the wheel.

Having thus described the invention, what is claimed as new, is—

1. A wheel provided on its periphery with a series of wedges, and a rim provided on its inner side with a series of wedges, the different series of wedges coöperating one with the other, the wedges of one series having each a projection thereon, and the wedges of the other series having each a recess therein and extending circumferentially farther at one side than at the opposite side of the recess.

2. A wheel comprising a felly, a bolt extending through the felly and having a plate on one end thereof, screws securing the plate to the felly, a band on the felly, wedges on the band having each a projection thereon extending from the thicker end toward but not to the thinner end thereof, a projection on the band, a rim extending about the band, wedges on the inner side of the rim in engagement with the wedges that are on the band and having each a recess that extends from the thinner end toward but not to the thicker end thereof and receiving the projection of the engaging wedge, the thinner end portion of each wedge being longer at one side than at the opposite side of the plane of the recess, an abutment on the inner side of the rim, a wedge between the two abutments, a keeper on the wedge, and a nut swiveled in the keeper and engaging the bolt.

In testimony whereof, I affix my signature in presence of two witnesses.

ELWOOD C. PHILLIPS.

Witnesses:
 Jos. F. Erne,
 Rob. A. Green.